United States Patent [19]

Restrepo

[11] 4,414,030

[45] Nov. 8, 1983

[54] FIBER-REINFORCED CEMENT, AND PROCESS

[76] Inventor: Jose M. Restrepo, Calle 85 No. 14-70, Of. 301-, Bogotá, Colombia

[21] Appl. No.: 325,035

[22] Filed: Nov. 25, 1981

[51] Int. Cl.³ ............................................. C04B 31/34
[52] U.S. Cl. ....................................... 106/90; 106/99
[58] Field of Search ...................................... 106/90, 99

[56] References Cited

U.S. PATENT DOCUMENTS 3,591,395  7/1971  Zonsveld et al. ...................... 106/99
4,261,754  4/1981  Krenchel et al. ...................... 106/90

*Primary Examiner*—James Poer
*Attorney, Agent, or Firm*—Browdy & Neimark

[57] ABSTRACT

A hydraulic cement mortar comprising uniformly dispersed reinforcing fibrillated plastic filaments having microfibrillated structure and elements manufactured therefrom have improved mechanical isotropic properties, such as enhanced performance regarding their semi-elastic limit and impact loading characteristics. It is disclosed also the process for manufacturing said elements.

12 Claims, 5 Drawing Figures

FIBER-REINFORCED CEMENT, AND PROCESS

BACKGROUND OF THE INVENTION

Heretofore, it has been proposed to use polymeric plastic materials to enhance the general behavior of cement-based parts, by incorporating such materials into the cement mix by means of varied techniques. According to one approach, for example, liquid polymeric-resin systems have been formulated to be embodied into mortars and concretes, developing thereby in their end products improved tensile strength and compressive strength, as well as characteristics of chemical and abrassion-resistance. Thus, a polymer mortar is prepared by partially replacing cement with polymer in the respective cementitious mix. This process requires the use on the one hand, of specific liquid polymer systems (resins, accelerators and catalysts) and, on the other, apparatus specially designed for proportioning and blending the appropriate amounts of materials. To that effect, the plastic industry has devised suitable polymer systems comprising resin as their main constituent, where the particular resin has often been selected from polyester and methyl- or polymethyl-methacrylate resins, together with promoters and frequently other proprietary additives. As a result, cement-mix processors depend on the use of hardly available materials. Moreover, another limitation which discourages the widespread use of the polymer resin-cement techniques is brought about by the need to use sophisticated and expensive proportioning and blending machines.

Also, in the always continuing efforts to enhance properties of parts manufactured from cement mixtures, particularly to increase the strength of cement-based building elements subjected to impact loading, the use of plastic filamentary reinforcing means has been proposed. Plastic fibers, however, have proved to be unsuitable in some respects as reinforcing materials. A main drawback is the one arising in great measure from the plastic fibers' hydrophobic nature, which comes to impair their frictional adhesion with the cementitious matrix whereby the stressed plastic filaments become debonded. The problem brought about by the poor physic-chemical adherence with their matrix is also involved to deter further the use of the so far commercially available plastic fibers as reinforcing means for cement products. In order to overcome such a hindrance posed to the use of monofilamentary plastic fibers it has been proposed to use certain plastic materials in the form of fibrillated films, as a reinforcing means for cement-based elements. The foregoing approach has permitted indeed the succesful attain went of good mechanical bonding of the reinforcing fibrillated films with the cement matrix.

Typical of the foregoing technique of manufacturing cement-based parts reinforced with plastic fibers is the U.K. Pat. No. 1,582,945 issued on Jan. 21, 1981, to the University of Surrey and D. J. Hannant. The patent teaches, for reinforcing purposes to use fibrillated polypropylene film, left as a structure comprised of spread-out, non-woven elongated fibers forming a film-like mesh, or used as a woven-mesh structure. In either case, the films are given a open-up, continuous structure having its dimensions and shape such as to closely fit the dimensions of the sheet-like, plastic-reinforced article. The plastic reinforced sheets manufctured by the method of the patent are necessarily layered structures, having the fibers as a single-direction reinforcement, as a direct consequence of their manufacturing process. The sheets have been proposed as suitable substitutes for asbestos-reinforced cement articles. However, certain conditions, particularly under high temperature conditions bring about spallation and delamination of the aforecited layered structures.

The U.K. Pat. No. 1,586,512 issued on Mar. 18, 1981, to Dansk Eternit-Fabrik, Denmark, deals with the manufacturing of building of sheets wherein the cement is reinforced by means of polypropylene fibers; the cementitious mix is reinforced further with mineral flakes and other fibers; and the fibers are concentrated in layers in the sheets.

According to the technologies based on the use of fibrillated plastic films as the reinforcing means for cement-based parts, they are coated with cement mortar and the excess mortar removed from the coated films; the so coated layers are laid in sequence each coextensively arranged onto the other until piling up the required number of layers to make up the desired sheet thickness. The so prepared sheet while still in its fresh condition may be handled to be molded into the shape of the particular mold used, suited to the end product. The articles manufactured in that way, because of prevailing orientation of the fibrils in their reinforcing films in one direction only, have values for its mechanical properties greatly differing according to the directions in which they are oriented; that is, the articles are said to be remarkably anisotropic. The anisotropic nature is controlled then, in accordance to the orientation in which the plastic mesh is placed and according to the mesh opening.

As stated above, in accordance with the foregoing process the reinforcing plastic films are mechanically slit into a predetermined degree of fibrillation which will be preserved throughout the manufacturing process and it will be the same amount of fibrillation that will be present in the hardened cement product. Since the fibrillated film is embedded into a previously prepared mortar paste, and inasmuch as the plastic material is chosen from polyolefines, particularly polypropylene, which are hardly wettable materials, the process therefore does not provide for means to help promote the desirable humidification to develop appropriate adherence between the fibrous material and the matrix encapsulating it. Poor adhesion impairs the tensile strength of the cement mortar elements obtained by this process, as well as its ability to develop closely spaced multicracking with desirable small cracks. The development of thin cracks in a closely arranged pattern is a phenomenon normally occurring in hardened cement elements which have been reinforced by means of aligned polypropylene fibers.

Summarizing, there are prior art processes designed for replacing asbestos fibers with polypropylene fibers as a reinforcing material for cement-based elements, particularly reinforced cement sheets, boards and the like, and the literature abounds in references to such techniques. Even though satisfactory plastic fibers-reinforced cement showing properties bearing comparison with those of asbestos-reinforced cements have been obtained through prior art processes, their use is restrained first, because they in any event originate a material suitable only for sheet products; the reinforcing material is not efficiently used thereby; the fiber-cement material is suited to be shaped by one definite molding operation only; and also because the end products obtained therefrom are remarkably anisotropic in nature.

SUMMARY OF THE INVENTION

Accordingly, the present invention relates to the preparation of cement mortar materials comprising reinforcing plastic fibers, wherein the above set forth drawbacks are overcome.

Consequently, a main object of this invention is to provide products from plastic-fibers reinforced mortar wherein the effect of mechanical anchoring of the fiber into the cementitious matrix is improved and, thus, more efficient use of the reinforcing material is achieved, whereby the end products are obtained in a less expensive manner.

Another object of the present invention is to provide a fiber-cement material which is reinforced by means of individual, refibrillated plastic fibers, made from fibrillated untwisted ribbons. Said material is very well suited to be molded into variously-shaped products by means of a wide variety of molding processes.

Still, an additional object of this invention is to provide fiber-cement products possessing identical mechanical properties when measured to any directions thereto and, accordingly, the end elements are as wholly isotropic as possible.

Yet another object of the invention is to provide plastic fiber-reinforced products having increased resistance to withstand tensile loads and impact loading after the hardened cementitious matrix has developed minute cracking therein, compared with the respective properties of the same cement matrix free from said reinforcing material.

The invention provides for a fibrous cement material comprised of a hydraulically setting binder as typified by Portland cement mortar, and randomly oriented separate plastic fibers uniformly dispersed therein, so as to bring the end-product anisotropy down to a minimum, and wherein said plastic fibers are given a microfibrillated structure, as it will be set forth hereinbelow.

In accordance with the invention, development of bond or true adherence between plastic fibers and the cement matrix is brought about only by actual mechanical interlocking between branched out end "hooked" fibrils outwardly extended from the separate plastic fibers, and the mortar matrix; so that said fibers are capable to transmit tension forces between spaced-apart adjacent blocks of the fissured matrix. The spacing between fracturing cracks in the matrix as well as the crack width can be controlled as a result of taking into consideration several fiber features regarding for instance, their shape, length, diameter orientation and their amount incorporated into the cement mass, as well as the degree of fibrillation given thereto.

The fiber present within the matrix, according to this invention, is a branched monofilament fiber derived from an untwisted fibrillated ribbon of fibrillate polyolefin film. The polyolefin film is cut into rather long narrow ribbons or strips of about 15 mm wide, and the non-twisted ribbons are fibrillated into fibers by conventional fibrillating means. The so fibrillated ribbons are cut into lengths going up to about 50 mm long. These sections of fibrillated ribbons are first air treated to spread out their separate fibers and then they are fed into a mortar mixing machine fitted with a high-speed propeller, wherein the mortar components and fibrous material are blended together. The mechanical shredding action which takes place in the mixing operation causes the ribbon fibrils to become further fibrillated or refibrillated and the ribbon fibrils are broken apart into individual filaments having a branched structure provided with microfibrils or fibrets outwardly projecting along their length. The projected microfibrils are somewhat curled in shape, and for their anchorage purposes they perform as anchoring elements or "hooks" within the cement hardened matrix. The filaments cross-sectional area and their length—as well as their length in one same direction—differ from one another.

The multiple cracking which has normally been shown to occur in cement-mortar hardened elements gives rise to lengthening of the fibers, in that way bringing stresses to bear along the longitudinal fibers which are directed to pull the fibers out from their condition embedded within the cement matrix. Longitudinal mineral reinforcing fibers and generally the fibers deprived of branched structure are liable to such pull-out failure, and actually fail. In contraposition, the side branches or "hooks" extended from the microfibrillated fibers according to the present invention, act to resist fiber dislodging from within the matrix.

DESCRIPTION OF THE INVENTION

Figure 1:
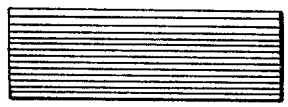
FIG. 1 is a plan view of a section of untwisted polypropylene fibrillated ribbon for use according to the invention.

The hereinabove stated objectives and advantages are achieved to the invention by providing a composite material comprising an intimate and homogeneous mixture of microfibrillated polyolefin filaments which are oriented in all of the spatial directions and kept evenly distributed throughout the mass of hydraulically setting binder, like Portland cement. Because of both the polydirectional orientation of the fibers in the mass, and their particularly fibrillated structure suitable to achieve a hook-like anchoranging reinforcement, the so reinforced composite material gives rise to elements having identical mechanical properties when measured at any directions thereof, that is, they physically behave as isotropic bodies. Of course, mechanical isotropy is a largely desirable behavior in elements.

The invention takes into consideration the observation that fibrillated sections cut from polyolefin ribbons, when subjected to the combined effect of a shear mixer and shredding action of the mortar components—basically cement and sand—besides breaking apart into monofilamentary fibers, these monofilaments become microfibrillated branched structures with laterally extending microfibrils or fibrets having varying length and cross-sectional area. Also, the microfibrillated polyolefine fiber are thoroughly wetted in the mortar components mixing operation. It should be noted at this point, however, that the true adherence of the plastic micro-fibrillated fibers with the cement matrix does not depend in the present process on a physicochemical phenomenon inasmuch as polyolefins and cement do not show chemical affinity to each other. Nor the good fiber-to-matrix bonding actually achieved can either be considered as being merely derived from frictional action, because the polyolefin lateral to longitudinal deformation ratio, or Poisson's ratio, is very high. As a result from such a high deformation ratio, a substantial contraction in the fiber cross-sectional area is due to take place when subjected to a lengthwise applied tensile stress and the fiber would become debonded and dislodged as soon as such a tensile stress is brought into action. On the fact that while the randomly oriented reinforcing filaments are kept from being pulled out from their embedded condition within the matrix and since they at the same time are able to undergo stretching therewithin, lies an essential feature of the invention. Because the present process provides for elastic behavior of the reinforcing filaments to take place, while at the same time allowing that the elongation brought about thereon by the crack opening will not be taken up only by the filament extension spanning or bridging the crack width, but instead of that, the elongation stress is brought to bear throughout the filament length, it follows therefore that the tensile stress is kept thereby below the ultimate elongation of the reinforcing filaments; if the tensile stress were to be concentrated upon the filament section intersecting or spanning the crack with, filament breaking would occur. On the contrary, the fibrillated reinforcing material according to the present invention makes it possible for the tensile stress to be transmitted between adjacent blocks of the fractured matrix through the entire filament stretchable sections while they are kept anchored within the cracked matrix, and this without being substantially affected by the matrix cracks. The adherence is not bonding to the matrix, it is interlocking of the fibrils of the monofilaments and the matrix.

According to the process of the present invention the mortar components—comprised of hydraulic cement, water and inorganic fillers such as sand having a particle size distribution such that no particle is greater than 1/10 the average length of the reinforced fibrillated filaments to be formed in the mixing operation—are blended together in a mixer machine equipped with a high-speed propeller.

As stated hereinabove, the fibrous material fed into the mixing step is derived from polyolefin film which has been slit into ribbons of about 15 mm wide; the ribbons while kept untwisted are fibrillated into fibrils by conventional mechanical means and then cut into sections of about 50 mm long; and thereafter the ribbon fibrillated sections are spread out by air jet means.

As a consequence of the vigorous mechanical stirring carried out in the mixing operation, in combination with the shredding effect that takes place between the plastic fibers and the abrasive particles in the cement mortar, the fibrillating action goes on still further. As a result, besides breaking the plastic ribbon apart into separate monofilaments, secondary branched microfibrils or fibrets are brought forth as ramifications at points along the sides of the monofilament's length. The so formed ramifications or lateral "hooks" account for the high adhesion degree achieved between the fibrous reinforcing material and the cementation matrix. Furthermore, inasmuch as the energetic mechanical stirring helps to improve wetting of the surface of the materials making up the fiber-cement mortar, this in turn causes the mix to enhance its fluidity, improves cement hydration which originates a higher-density mortar, and the branched fibrils or hooks anchoring power is still improved further.

As a consequence of the plastic fiber own resilience, its effective length in one direction is a function of its diameter. Also, the amount of fibrillation caused in the plastic ribbons to form separate monofilaments, as well as the mixing time and of course the degree of branching so effected on the fiber effective length. Further, the fiber effective length and its diameter along with the amount of fiber are determining factors of the width and spacing of cracks to be developed in the fiber-cement hardened element once it undergoes its naturally occurring multiple cracking. This hardened element, however already cracked, continues still to effectively withstand tensile stresses.

Performance specifications to be met by a particular fiber-cement element once cracked, will determine the permissible breadth of cracks and spacing therebetween. In the process in accordance with the present invention these characteristics can be controlled since it provides for means to exercise influence over the process parameters related to diameter and length of fiber and of course its amount used.

Both economic considerations and because of its easy fibrillation, together with the inert chemical nature of polypropylene towards the cement paste, make the polypropylene film the polyolefin preferred for the purpose of the process of the present invention. However, there are neither theoritical nor practical considerations ruling out the use of polyethylene alone instead of polypropylene, nor its admixtures therewith. Other plastic materials films such as acrylonitrile films, can also be used.

The physical properties of the fiber-cement elements reinforced as described above do not decay with time, and, on the contrary, they are increased such as it is the case with articles made from plain cement mortars; and the fibers embedded within the matrix do remain unaffected by natural environmental heat and light.

The material obtained can either be shaped into sheets or it can be molded into several other forms. Moreover, because of its mechanical isotropic properties this is a multipurpose material that can in an economic manner be used for applications such as to replace asbestos-cement as well as for forming flexible coatings, and it is suitable also for varied specific applications where high impact loading and elastic behavior are required characteristics.

For the only purpose of illustrating the invention still further, it is set forth the following specific Example, which by no means is intended to be limitative thereof. By way of even further explanation the Example makes reference to the accompanying schematic drawing.

EXAMPLE

Sections of untwisted polypropylene fibrillated ribbon having the general structure schematically shown in FIG. 1, are prepared. The ribbon section is conventionally fibrillated along lengthwise extending slits. In this slit condition the ribbon has the following features:

specific weight: 0.91
denier: 6000
width: 15 mm
thickness: 50 microns
length of section: 47 mm From the lack of affinity for water shown by the polypropylene, it could normally be foreseen that the cement elements reinforced by means of such a material would rather have poor mechanical properties. Also, from their low specific weight the polypropylene fibers would be expected to come apart from the cementitious fluid medium or form separate phases therein, thus producing defective end products. These deficiencies suggested from the polyolefins' own nature are surmounted by means of the process of the invention, because the microfibrillated structure that is imparted in the process provides the fibrous reinforcing material with increased specific area to be wet by the cementitious medium which in turn makes it easy to form the homogeneous mixture.

Figure 2:
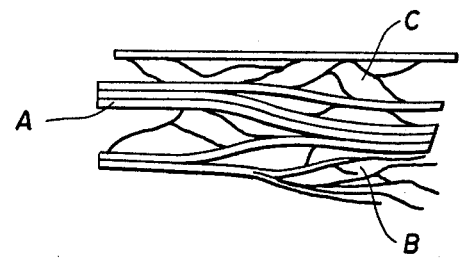
FIG. 2 is a plan view of the ribbon of FIG. 1 after being subjected to a spreading out step by means of an air stream.

12.5 Kg of the so prepared fibrillated ribbon having the aforestated characteristics were subjected to a spreading out step by means of an air stream. At the end of this opening step the ribbon pieces are seen as having the structure depicted in FIG. 2. It was attained in that way a non-uniform degree of spreading out in the ribbon. There are shown in the same cut piece of ribbon two distinct zones: the A zone where despite the ribbon having been fibrillated lengthwise its fibers still remain connected together; the B zone, where the filaments are provided with a cross-sectional area ranging from about circular to nearly rectangular in shape, and they are comprised of some few fibrils; and the C zone where there are strips of about 1 mm wide, which are generally rectangular in cross-sectional area and being slightly spaced apart but being still connected each other through fibrils diagonally arranged therebetween. These strips will be additionally fibrillated in the next mixing step.

Then, the amount (12.5 kg) of slit but untwisted, spread-out ribbon is fed together with 500 kg Type I Portland cement, 300 liters of water and 100 kg of silica sand having a free moisture content below 5% wherein the ribbon constitutes about 2% by weight of the dry materials into a shear mixing machine, while the propeller is kept running the charging operation is carried out little by little for a length of time of at least 6 minutes. The amount of polypropylene used represents 3.7% of the end volume of the hardened product.

The mixing compartment of the machine is chosen so as to be at least 20% greater than the volume of wet mixture. Said compartment is truncated-cone shaped and it is arranged with its smaller base downwardly directed.

Figure 3:
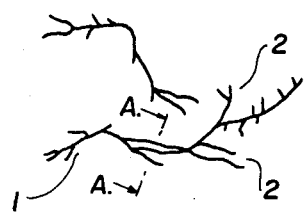
FIG. 3 illustrates two microfibrillated filaments as they finally appear as reinforcing means for a cement matrix.
Figure 4:
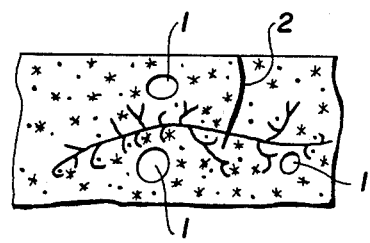
FIG. 4 is a view of such a filament as shown in FIG. 3 within a cement matrix.
Figure 5:
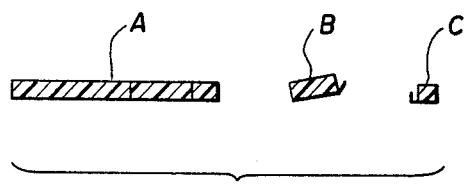
FIG. 5 schematically illustrates a filament cross-sectional area.

All of the particles of the sand mixed, passed through the U.S.S. sieve No. 18 (screen opening, 1 mm) and no more than 10% by weight of the particles passed through the U.S. Standard Series sieve No. 100 (mesh opening 0.149 mm). The mixing time was 14 min. with the propeller running at 1200 rpm. In the mixer machine, the fibrillated ribbon undergoes a strong shredding action by the sand and cement particles whereby the ribbon is fully broken apart into separate monofilaments. These monofilaments are at the same time given the further fibrillated structure, by opening them up into a number of microfibrils or generally crimped fibrets varying in cross-sectional area and length. The microfibrillated filamentary structure thereby brought about into the monofilaments is schematically shown in FIG. 3. This FIG. 3 illustrates two microfibrillated filaments such as they finally appear as reinforcing means for the cement matrix. In zone 1 of FIG. 3 there are shown microfibrils and branches are illustrated in its zone 2, which are the elements basically and strongly anchoring the monofilaments to the cement matrix. In FIG. 4 a filament is illustrated within the matrix, with an entrapped air bubble being shown at (1), a matrix crack in (2), and a filament with its hook-like microfibrils is also shown. FIG. 5 illustrates the filament cross-sectional area.

As hereinabove stated, the adherence of the reinforcing fiber with the reinforced cement matrix is other than a friction phenomenon, inasmuch as in the polypropylene fiber, and the like plastic fibers, under tensile stress the Poisson's ratio does not allow for contact between the hardened matrix and the reinforcing fiber outer surface. Adherence is therefore the result of anchoring effect.

The specific weight of the fiber-cement as it finally sets is about 2.00. This is relatively high figure, and it reflects the superior densification achieved for the material constituents, which increases the values of its mechanical properties.

The tensile strength of a plain matrix prepared from the same cement paste but without polypropylene fibers added, was of about 34 kg/cm$^2$; whereas the tensile strength of a comparable specimen of polypropylene-reinforced matrix prepared according to the procedure of the present Example, benefits from the tensile strength of the fibrillated polypropylene filament which is of about 3500 kg/cm$^2$ at its limit of proportionality; modulus of rupture for tensile strength is of about 4000 kg/cm$^2$.

The distribution of fibers within the matrix, along with the means through which their anchorage to the matrix is achieved, make it sure for the fiber-cement element to resist tension forces after the hardened matrix has become cracked, and that property is equally shown by the element at any directions to its body. The general condition for all of the physical properties of the fiber-cement material prepared according to the present invention lies in its isotropy which is accomplished as a result from the process of its manufacture.

In its fresh condition, the mortar prepared in accordance with the present invention can easily be molded. Its molding may be carried out by means of extrusion, injection molding, casting, centrifugal molding or by means of a combination of the above molding methods. Parts of that material while in their fresh condition are easily joined to each other as a result of the intercrossing of filaments of the different masses to be joined together.

In the foregoing specification the process of the invention permitting to carry into effect the aforecited objectives thereof, has been set out. It should be understood, however, that it is not intended to limit the invention to the details disclosed in this description. It is intended that its equivalents, obvious to the skilled in the art to which the invention pertains, be comprised within the scope of the invention, as it is defined by means of the following claims.

I claim:

1. A cement mortar consisting essentially of:
   water, particulate mortar components of cement and sand, and separate reinforcing filaments consisting essentially of filaments obtained from polyolefin film,
   said separate microfibrillated filaments consisting in sections shredded from non-twisted fibrillated ribbons having a length of up to 50 mm long, with said fibrillated ribbons having been split apart from said polyolefin film and subjected to microfibrillation by stirring particulate mortar components and said reinforcing filaments to effect stretching the fibrillated film fibrils to breakage so generating smaller splinters which are the microfibrils, wherein said separate reinforcing filaments have filamentary structure comprising hooked microfibrils laterally branching from points along the length of said separate filaments, and wherein separate reinforcing plastic filaments are evenly distributed throughout the body of said cement mortar in a randomly oriented fashion along all of its spatial directions.

2. A cement mortar comprising microfibrillated reinforcing filaments obtained from a polyolefin film, wherein said filaments are separate sections of fiber having a length of up to about 50 mm long, with said separate filament sections being provided with curled microfibrils laterally branching out along the length thereof; and wherein said separate filaments are homogeneously dispersed throughout said cement mortar in randomly directed orientations in all of its spatial directions using high-speed stirring, and where the filamentary reinforcing material is comprised in an amount between 0.2% and 15% by volume of the total dry volume of non-reinforced mortar.

3. Cement mortar as claimed in claim 1 or 2, wherein said polyolefin is selected from the group consisting of polypropylene, polyethylene and mixtures thereof.

4. An isotropic element manufactured from a cement mortar comprising about 0.2%-15% by volume of microfibrillated fiberous reinforcing material over total dry volume comprised of separate filaments evenly distributed throughout the matrix of said element, wherein said filaments are randomly dispersed in all of the spatial directions of said element, with said filaments being separate sections of about 50 mm long cut from fibrillated polyolefin film and subjected to a microfibrillation operation, and with said separate filaments being provided with laterally extending curled or hooked microfibrils branching from points spaced along the length thereof, whereby said element shows substantially equal mechanical properties when measured in any directions of the body thereof.

5. A cement mortar-based element as claimed in claim 4 wherein said fibrous reinforcing material is selected from the group consisting of polypropylene, polyethylene and mixtures thereof.

6. A method of manufacturing a cement mortar-based, plastic fiber-reinforced element showing mechanical properties which are independent of the direction of its body in which the properties are measured, which method comprises embodying into the cement mortar from about 0.20% by volume to about 15% by volume of fibrous reinforcing plastic material comprised of a fibrillated polyolefin; shredding the mortar-fibrous mix to form thereby separate filaments of about 50 mm long homogeneously dispersed throughout said mix while at the same time said separate filaments are given a microfibrillated structure having laterally extended curled or hooked microfibrils branching from points spaced along the length thereof; and molding said mortar-fibrous material mix into any element shape with said reinforcing microfibrillated structures being randomly oriented throughout the hardened matrix.

7. A method for manufacturing isotropic elements according to claim 6, wherein said fibrous reinforcing plastic material is polypropylene.

8. A process for producing cement mortar-based elements having mechanical properties substantially equal in all of the directions of their bodies which comprises the steps of:

preparing non-twisted, fibrillated ribbons from a polyolefin film material and cutting the fibrillated ribbons into sections of up to about 50 mm long;

spreading out said fibrillated cut ribbons by air treating the same;

feeding said sections of open-up fibrillated cut ribbon sections into a mixing device provided with high-speed rotary stirring means while at the same time cement, fine aggregate and water are being fed into said mixing device, and stirring the mix for a time enough to bring about by means of the shredding action between said mix particulate materials and said ribbons separate microfibrillated filaments having microfibrillated structure provided with curled or hooked microfibrils branching therealong, with said microfibrillated filaments being homogeneously distributed throughout the mass of said cement mortar mix, and in orientations randomly directed along all of its spatial directions; and, molding said cement mortar containing said microfibrillated filaments, into the shape of said elements.

9. A process according to claim 8, where said polyolefin film is selected from the group consisting of polypropylene, polyethylene, and mixes thereof.

10. A cement mortar in accordance with any one of claims 1, 2 or 4 wherein said reinforcing filaments are present in an amount between about 2.5% and 3.5% by volume based on the total dry volume of non-reinforced mortar.

11. A cement mortar according to claim 10 containing inorganic filler having a particle size distribution such that substantially no particle of inorganic filler is greater than 1/10 the average length of said reinforcing filaments.

12. A process according to claim 6 or 8 wherein said mixing is effected with a propeller running at a speed of at least approximately 1,200 rpm for several minutes.

* * * * *